(12) United States Patent
Leiber et al.

(10) Patent No.: US 6,789,262 B1
(45) Date of Patent: Sep. 7, 2004

(54) DATA STORAGE MEDIUM WITH STEPPED WINDING CORE

(75) Inventors: Jorn Leiber, Heiligenstedtenerkamp (DE); Bernhard Mussig, Seevetal (DE); Stefan Stadler, Hamburg (DE); Steffen Noehte, Weinheim (DE)

(73) Assignee: tesa scribos GmbH, Heidelberg (DE)

( * ) Notice: Subject to any disclaimer, the term of this patent is extended or adjusted under 35 U.S.C. 154(b) by 0 days.

(21) Appl. No.: 10/030,475

(22) PCT Filed: May 23, 2000

(86) PCT No.: PCT/EP00/04673
§ 371 (c)(1),
(2), (4) Date: Feb. 20, 2002

(87) PCT Pub. No.: WO01/04880
PCT Pub. Date: Jan. 18, 2001

(30) Foreign Application Priority Data
Jul. 12, 1999 (DE) ......................... 199 32 899

(51) Int. Cl.[7] ............. G11B 7/003; G11B 7/00; G11B 3/70; G11B 5/84; G11B 7/26
(52) U.S. Cl. .............. 720/746; 369/287; 369/100
(58) Field of Search ............. 369/287, 100, 369/99, 283, 272, 286, 176, 258, 260, 261; 235/487, 488; 242/613, 613.5, 600, 607, 609.4, 609, 611.2, 125, 125.1, 332.7, 437, 476.1; D14/484, 483, 476, 475, 474; 360/131, 132, 134; 720/695, 718, 746

(56) References Cited

U.S. PATENT DOCUMENTS

| 5,077,724 A | * | 12/1991 | Gregg ...................... 720/695 |
| 5,890,674 A | * | 4/1999 | Major ...................... 242/587 |
| 6,364,233 B1 | * | 4/2002 | Crowley .................. 242/332.8 |
| 6,386,458 B1 | * | 5/2002 | Leiber et al. ............... 235/487 |

FOREIGN PATENT DOCUMENTS

| JP | 60 052941 | | 3/1985 |
| JP | 61 099981 | | 5/1986 |
| JP | 5/109234 A | * | 4/1993 |
| JP | 06 020292 | | 1/1994 |
| JP | 8/273325 A | * | 10/1996 |

OTHER PUBLICATIONS

Inhaltsverzeichnis CHIP 9/98 Nov. 99 Pich Klebe für mehr Gigabyte.

* cited by examiner

Primary Examiner—Julie Anne Watko
(74) Attorney, Agent, or Firm—Nixon & Vanderhye

(57) ABSTRACT

A data storage medium includes an information carrier wound onto a winding core in a spiral manner for optically readable information units. The winding core is configured in a spiral manner on its outer contour and has a step. The height of the step is matched to the thickness of the information carrier. The inner end of the information carrier rests on the winding core at the step or in the area of the step.

32 Claims, 1 Drawing Sheet

U.S. Patent
Sep. 7, 2004
US 6,789,262 B1
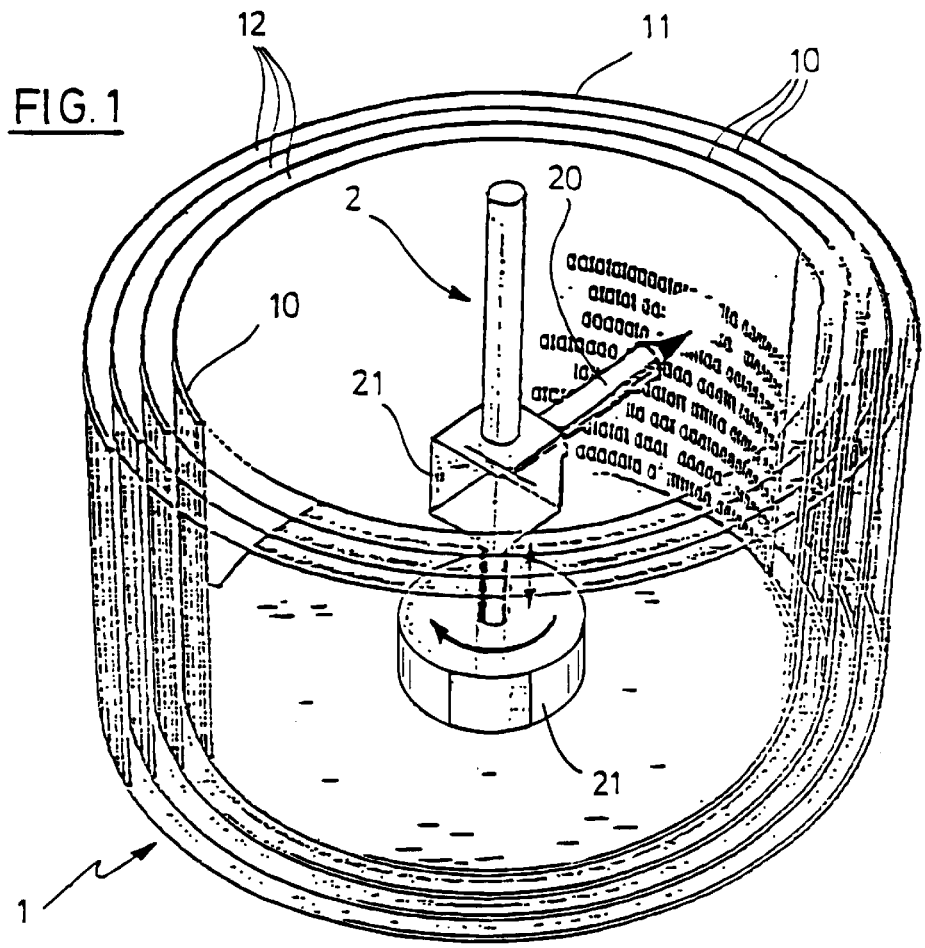
FIG. 1
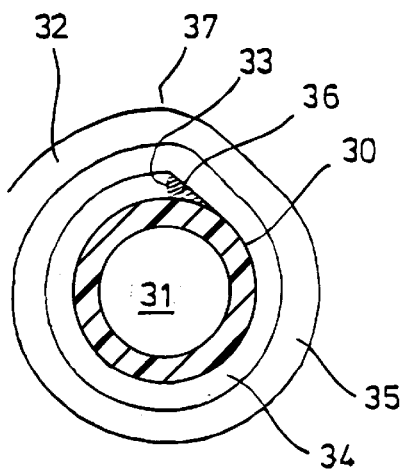
FIG. 2
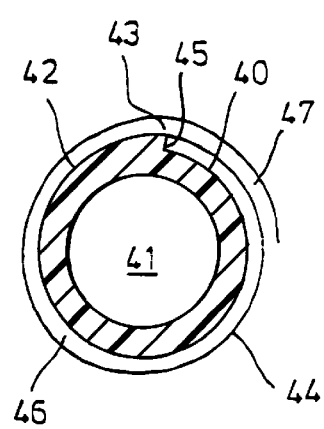
FIG. 3
FIG. 4

DATA STORAGE MEDIUM WITH STEPPED WINDING CORE

This application is the US national phase of international application PCT/EP00/04673 filed May 23, 2000 which designated the U.S.

BACKGROUND AND SUMMARY

The invention relates to a data storage medium having an information carrier wound onto a winding core in a spiral manner for optically readable information units.

DE 298 16 802 describes a data storage medium having an information carrier, wound in a plurality of plies onto a winding core in a spiral manner, for optically readable information units. The information carrier may comprise a polymer film, with an adhesion layer being located between each pair of adjacent plies. Information can be written to this data storage medium by locally heating the polymer film by means of a write beam of a data drive, as a result of which the refractive index and thus the reflecting power (reflectivity) change locally at the interface of the polymer film. This may be detected by means of a read beam in the data drive. By focusing the write beam or read beam, information may be specifically written to or read from a preselected ply of the information carrier. The winding core may be optically transparent and may have a recess in its central area that serves to accommodate the read/write device of a data drive. The read/write device is moved relative to the data storage medium, while the data storage medium is stationary, so that the data storage medium need not be balanced to take account of a rapid rotational motion.

In the previously known data storage medium, it proves to be disadvantageous that the inner end of the information carrier, when it is wound onto the cylindrical winding core, forms a type of projection, to which the following plies of the information carrier have to adapt, so that the result is deviations from an ideal spiral form. In particular, the radial spacing of the inner plies of the information carrier from the center of the winding core changes rather abruptly in the area of the projection. When data are being read out or written in, this can lead to difficulties in tracking the focus of the read beam or the write beam.

It is an object of the invention to provide a data storage medium having an information carrier wound onto a winding core in a spiral manner for optically readable information units from which the information can be read out without problems.

This object is achieved by a data storage medium having the features of claim 1. Advantageous refinements of the invention emerge from the dependent claims.

The data storage medium according to the invention has an information carrier wound onto a winding core in a spiral manner for optically readable information units. The winding core is configured in a spiral manner on its outer contour and has a step, whose height is matched to the thickness of the information carrier, the inner end of the information carrier resting on the winding core at the step or in the area of the step.

The fact that the outer contour of the winding core is already configured in a spiral manner, and the inner end of the information carrier rests on the winding core at the step or at a relatively short distance therefrom, the information carrier, at the start of its second winding, encounters a largely smooth surface, so that the radial spacing of the information carrier from the center of the winding core increases gradually over the entire length of the information carrier (in such a way that it largely corresponds to an ideal spiral shape) and not abruptly. The invention therefore has a particularly beneficial effect on data storage media in which the information carrier is wound in a plurality of plies, and in this case the inner plies in particular profit. If the read beam or—if the data storage medium can also be written— the write beam scans the information carrier, it is accordingly not necessary to displace the focus suddenly at specific locations, for which reason higher reading speeds and—if appropriate—writing speeds can be achieved than in the case of the previously known data storage medium.

In a preferred embodiment of the invention, the spirally configured outer contour with the step is formed integrally on the winding core.

In an alternative configuration, the winding core has a component similar to a cylinder and a separate component, which at least partly surrounds the component similar to a cylinder and on which the spirally configured outer contour with the step is formed. In this case, the separate component can be flexible, at least during the production of the winding core, can have a basic shape similar to a wedge, the length of the wedge being less than or equal to the periphery of the component similar to a cylinder, and the height of the wedge corresponding to the height of the step, and can be placed onto the component similar to a cylinder. With the aid of the separate component, therefore, the spiral-like outer contour of the winding core, deviating from the cylindrical shape, is formed. The length of the wedge can be less than the periphery of the component similar to a cylinder; however, the result is then greater deviations from the ideal spiral shape. Preferably, the separate component and the component similar to a cylinder are adhesively bonded to each other during the production of the winding core.

In a preferred embodiment of the invention, the winding core is optically transparent and has a recess in its central area. In this case, it is possible to arrange in the recess in the central area of the winding core a read device and, optionally, a write device of a drive tuned to the data storage medium and to move it relative to the data storage medium, while the data storage medium is stationary, for the purpose of reading and/or writing information. A stationary data storage medium has the advantage that it does not need to be balanced to permit high rotational speeds, which has a beneficial effect on the production costs.

The information carrier preferably comprises a polymer film whose refractive index can be changed locally by heating. Material considered for the polymer film comprises, for example, polymethylmethacrylate (PMMA) or biaxially oriented polypropylene (BOPP). If polypropylene, following extrusion to the film, is pretensioned in two planes, a high inherent energy is stored in the material. In the case of local heating, by means of a write beam, for example, there is a severe change in the material by reformation, and this is so even when a relatively small amount of energy is deposited per unit area. In this way it is possible, for example, to achieve a change in the refractive index of approximately 0.2 over an area for one stored information unit with a diameter of approximately 1 $\mu$m.

The polymer film may be assigned an absorber which is set up at least partly to absorb a write beam and to emit the generated heat at least partly, locally, to the polymer film. The absorber comprises, for example, dye molecules which are present in the polymer film or in an adhesion layer adjacent to the polymer film, and permits local heating of the polymer film, sufficient to change the refractive index, for a relatively low write beam intensity.

As already mentioned, the advantages of the invention come to bear in particular if the information carrier is wound onto the winding core in a plurality of plies. The polymer film is therefore preferably wound up in a plurality of polymer film plies, through which information can be written into a preselected polymer film ply or can be read from a preselected polymer film ply. There may be an adhesion layer provided in each case between adjacent polymer film plies in order to fix the polymer film plies to one another. For example, 10 to 30 polymer film plies may be wound atop one another, or else a greater or lesser number. At a polymer film thickness of between 10 $\mu$m and 100 $\mu$m, preferably below 50 $\mu$m or around 35 $\mu$m, the information on different polymer film plies can be separated from one another with good resolution by means, for example, of read/write devices which are known from DVD technology. An adhesion layer may, for example, have a thickness in the range between 1 $\mu$m and 40 $\mu$m, preferably below 25 $\mu$m or around 2 $\mu$m. A suitable adhesion agent comprises, for example, an acrylate adhesive which is free from air bubbles and which is crosslinked, for example, chemically or by irradiation with UV or electron beams. If an adhesion layer is arranged between adjacent polymer film plies, the height of the step on the winding core should correspond approximately to the thickness of the polymer film plus the thickness of the adhesion layer.

Preferably, the refractive index of the adhesion layer differs only slightly from the refractive index of the polymer film, in order to minimize disruptive reflections of the read beam or of the write beam at a boundary between a polymer film ply and an adjacent adhesion layer. It is particularly advantageous if the difference in the refractive indices is less than 0.005. Any difference in the refractive indices may, however, be utilized for the purpose of formatting the data storage medium.

BRIEF DESCRIPTION OF THE DRAWINGS

In the following text, the invention will be explained in more detail by using exemplary embodiments. In the drawings:

FIG. 1 shows a data storage means which comprises a spiral-wound information carrier and a winding core configured in accordance with the invention, in a schematic perspective illustration, parts of a drive tuned to the data storage medium being arranged within the winding core, FIG. 2 shows a schematic cross section through a conventional winding core with the inner plies of a spiral-wound information carrier, FIG. 3 shows a schematic cross section through a first embodiment of a winding core configured in accordance with the invention with the innermost plies of a spiral-wound information carrier, and FIG. 4 shows a schematic cross section through a second embodiment of a winding core configured in accordance with the invention with the innermost plies of a spiral-wound information carrier.

DETAILED DESCRIPTION OF EXAMPLE EMBODIMENTS

FIG. 1 shows a schematic illustration of a data storage medium 1 and a read/write device 2 of a drive tuned to the data storage medium 1. The data storage medium 1 has a number of plies 10 of a polymer film 11 which serves as information carrier and is wound in a spiral manner onto an optically transparent winding core. For reasons of clarity, the winding core is not shown in FIG. 1; it is located within the innermost ply 10. Embodiments of the winding core are described in more detail below, using FIGS. 3 and 4. For better illustration, the individual plies 10 of the polymer film 11 are shown as concentric circular rings in FIG. 1, although the plies 10 are formed by winding the polymer film 11 in a spiral manner. An adhesion layer 12 is in each case arranged between adjacent plies 10 of the polymer film 11. For reasons of clarity, the adhesion layers 12 are shown in FIG. 1 with an increased thickness which is not to scale.

In the exemplary embodiment, the polymer film 11 consists of biaxially oriented polypropylene and has been pretensioned in both surface directions prior to winding. In the embodiment example, the polymer film 11 has a thickness of 35 $\mu$m; other thicknesses in the range from 10 $\mu$m to 100 $\mu$m or even thicknesses lying outside of this range are likewise conceivable. The adhesion layers 12 are free from gas bubbles and in the embodiment example consist of acrylate adhesive, to which an absorber dye has been admixed, at a thickness of 23 $\mu$m preferred layer thicknesses being between 1 $\mu$m and 40 $\mu$m. In the exemplary embodiment, the data storage medium 1 contains twenty plies 10 of the polymer film 11 and has an external diameter of approximately 30 mm. The height of the wound cylinder is 19 mm. A different number of plies 10, or different dimensions, are likewise possible. The number of windings or plies 10 may, for example, be between ten and thirty, or else may be greater than thirty.

The read/write device 2 arranged in the interior of the wound core comprises a read/write head 20 which can be moved backward and forward axially and rotated in the directions of the arrows that have been drawn in, by means of a mechanism 21. The read/write head 20 has optical elements by means of which a light beam (of wavelength, for example, 630 nm or 532 nm) produced by a laser, which is not shown in FIG. 1, may be focused onto the individual plies 10 of the polymer film 11. Since the read/write head 20 is moved by means of the mechanism 21, it is able to scan fully all plies 10 of the data storage medium 1. In the exemplary embodiment, the data storage medium 1 is stationary. Consequently, it does not need to be balanced to take account of a high rotational speed (and also need not be unwound or rewound), unlike the read/write head 20. For the sake of clarity, the elements provided for balancing the read/write head 20 have not been shown in FIG. 1. The laser mentioned is located outside of the read/write head 20 and is stationary; the laser beam is guided into the read/write head 20 via optical elements.

In the exemplary embodiment, the laser is operated with a beam power of approximately 1 mW for the purpose of storing or writing information to the data storage medium 1. The laser beam serves here as a write beam and is focused onto a preselected ply 10 of the polymer film 11, in such a way that the beam spot is smaller than 1 $\mu$m, the light energy being introduced in the form of short pulses of approximately 10 $\mu$s in duration. The energy of the write beam is absorbed in the beam spot, promoted by the absorber in the adjacent adhesion layer 12, leading to local heating of the polymer film 11 and thus to a local change in the refractive index and in the reflectivity.

In order to read stored information from the data storage medium 1, the laser is operated in continuous wave mode (CW mode). The read beam focused onto the desired site is reflected as a function of the stored information, and the intensity of the reflected beam is detected by a detector in the read/write device 2.

The data storage medium may also be of an embodiment which cannot be written by the user. In this case, it contains information units written by the manufacturer. In this case, there is no need for a write function in the user's data drive.

Via the information units, the information can be stored in binary form, that is to say two states are distinguished on the polymer film at the location of one information unit. However, storage in a plurality of gray stages is also possible, for example by means of defined setting of the refractive index of the polymer film at the location of an information unit.

In the following text, various embodiments of the winding core of the data storage medium will be considered in more detail.

Firstly, FIG. 2 shows a conventional winding core 30 in a schematic cross-sectional view. The winding core is configured as a cylindrical sleeve having a recess 31 to accommodate the read/write device 2 of a data drive. Wound around the winding core 30 is an information carrier 32, beginning at its inner end 33. Using the terminology of FIG. 1, the information carrier 32 comprises the polymer film 11 and an adhesion layer 12 adjacent thereto. The innermost ply 34 of the information carrier 32 is formed by the first winding around the winding core 30, and the following ply 35 begins after that. Since the outer contour of the winding core 30 is circular, the information carrier 32 has to deviate radially outward in the area of its inner end 32 as it begins the following ply 35, so that a cavity 36 is produced, see FIG. 2. As a result, the plies of the information carrier 32, in particular its inner plies, exhibit considerable deviations from an ideal spiral course in the area of a location 37. If the intention is to read information out of the information carrier 32 or write it there, the focus of the optics of the read/write device has to be tracked very quickly in the area of the location 37 in order that a selected ply remains focused. This reduces the speed with which data can be written and read, and is therefore disadvantageous.

FIG. 3 shows a winding core 40 configured in accordance with the invention in a schematic sectional view. The winding core 40 likewise has a recess 41 to accommodate a read/write device. On the other hand, the outer contour 42 of the winding core 40 is not circular but is shaped like a spiral and has a step 43, see FIG. 3. The height of the step 43, that is to say the size of the radial jump in the outer contour 42 at the step 43, is matched to the thickness of the information carrier (designated by 44 here) which is wound onto the winding core 40. In the exemplary embodiment, the information carrier 44 comprises a polymer film 11, there being an adhesion layer 12 in each case between adjacent plies 10 of the polymer film 11. In this case, therefore, the thickness of the information carrier 44 is equal to the thickness of the polymer film 11 plus the thickness of an adhesion layer 12.

FIG. 3 shows how the inner end of the information carrier 44 rests on the step 43. The innermost ply 46 rests directly on the outer contour 42 of the winding core 40, preferably over an adhesion layer. At the start of the following ply 47, the step 43 ensures that the information carrier 44 runs to a large extent on an ideal spiral, as revealed by FIG. 3. In particular, an abrupt jump in the radial direction, such as occurs in the case of the conventional winding core 30, is prevented. The inner end 45 of the information carrier 44 does not need to rest directly on the step 43; a certain spacing from the step 43 is also acceptable. The critical factor is that an unfavorable course of the information carrier 44, that is to say a course similar to that shown in FIG. 2, is avoided.

The winding core 40 according to FIG. 3 is formed in one piece from an optically transparent plastic, so that the spirally configured outer contour 42 with the step 43 is formed integrally on the winding core 40.

FIG. 4 shows another embodiment of the winding core, which is designated here by 40'. Parts and components which coincide with the embodiment shown in FIG. 3 are provided with the same reference symbols in FIG. 4 as in FIG. 3. However, the winding core 40' is not formed in one piece but has a component 48 similar to a cylinder and a separate component 49, which surrounds the component 48 similar to a cylinder over approximately half of its periphery. The largely spiral outer contour 42 of the winding core 40' is in this case substantially determined by the separate component 49.

In the exemplary embodiment, the separate component 49 has a basic shape similar to a wedge, the length of the wedge corresponding to about half the periphery of the component 48 similar to a cylinder. The height of the wedge coincides with the thickness of the information carrier 44. During the production of the winding core 40', the separate component 49 is flexible and can then be matched to the shape of the component 48 similar to a cylinder, to which it is adhesively bonded. If the separate component 49 is longer than shown in the exemplary embodiment, still better matching of the shape of the wound-up information carrier 44 to an ideal spiral shape can be achieved. For example, it is conceivable for the length of the wedge of the separate component 49 to coincide with the periphery of the component 48 similar to a cylinder, so that the separate component 49 is placed once around the component 48 similar to a cylinder.

We claim:

1. A data storage medium comprising an information carrier wound onto a winding core in a spiral manner for optically readable information units, the winding core being configured in a spiral manner on its outer contour and including a step, whose height is matched to the thickness of the information carrier, and the inner end of the information carrier resting on the winding core at the step or in the area of the step.

2. The data storage medium as claimed in claim 1, wherein the spirally configured outer contour with the step is formed integrally on the winding core.

3. The data storage medium as claimed in claim 1, wherein the winding core includes a component similar to a cylinder and a separate component, which at least partly surrounds the component similar to a cylinder and on which the spirally configured outer contour with the step is formed.

4. The data storage medium as claimed in claim 3, wherein the separate component is flexible, at least during the production of the winding core, has a basic shape similar to a wedge, the length of the wedge being less than or equal to the periphery of the component similar to a cylinder, and the height of the wedge corresponding to the height of the step, and is placed onto the component similar to a cylinder.

5. The data storage medium as claimed in claim 1, wherein the information carrier comprises a polymer film whose refractive index can be changed locally by heating.

6. The data storage medium as claimed in claim 5, wherein the polymer film is assigned an absorber which is set up at least partly to absorb a write beam and to emit the generated heat at least partly, locally, to the polymer film.

7. The data storage medium as claimed in claim 5, wherein the polymer film is wound up in a plurality of polymer film plies, through which information can be written into a prescribed polymer film ply or can be read from a preselected polymer film ply.

8. The data storage medium as claimed in claim 7, wherein an adhesion layer is in each case provided between adjacent polymer film plies.

9. The data storage medium as claimed in claim 8, wherein the refractive index of the adhesion layer differs only slightly from the refractive index of the polymer film.

10. The data storage medium as claimed in claim 1, wherein the winding core is optically transparent and has a recess in its central area.

11. A method for using a data storage medium comprising an information carrier wound onto an optically transparent winding core in a spiral manner for optically readable information units, the winding core having a recess in its central area, being configured in a spiral manner on its outer contour and including a step whose height is matched to the thickness of the information carrier, the inner end of the information carrier resting on the winding core at the step or in the area of the step, the method comprising:

disposing a read device having a read beam in the recess of the data storage medium; and moving the read device while keeping the data storage medium stationary in order to direct the read beam onto data storage medium to read data therefrom.

12. The method as claimed in claim 11, wherein the read device is part of a read/write device that also has a write beam, and the method further comprises:

moving the read/write device while keeping the data storage medium stationary in order to direct the write beam onto the data storage medium to write data thereto.

13. A data storage medium comprising an information carrier wound onto a winding core in a spiral manner, the winding core comprising a spiral-like outer contour having a step portion with a size corresponding to the thickness of the information carrier.

14. The data storage medium as claimed in claim 13, wherein the information carrier is wound onto the winding core beginning at or in the vicinity of the step.

15. The data storage medium as claimed in claim 13, wherein the winding core has a one-piece construction.

16. The data storage medium as claimed in claim 13, wherein the winding core has a two-piece construction.

17. The data storage medium as claimed in claim 16, wherein the two-piece construction comprises a substantially cylindrical member and a wedge-shaped member extending at least partially around the outer surface of the substantially cylindrical member.

18. The data storage medium as claimed in claim 13, wherein the information carrier comprises a polymer film.

19. The data storage medium as claimed in claim 18, wherein the polymer film comprises a polymer film having an optical property that can be changed locally by heat.

20. The data storage medium as claimed in claim 19, further comprising an absorber for absorbing the heat and subsequently emitting at least part of the absorbed heat to the polymer film.

21. The data storage medium as claimed in claim 13, wherein the information carrier is spirally-wound so as to provide a plurality of plies.

22. The data storage medium as claimed in claim 21, further comprising:

an adhesion layer disposed between adjacent plies of the information carrier.

23. The data storage medium as claimed in claim 22, wherein the adhesion layer comprises acrylate adhesive.

24. The data storage medium as claimed in claim 23, wherein the adhesion layer comprises acrylate adhesive mixed with an absorber dye for absorbing heat.

25. A memory device comprising:

a data storage medium comprising an information carrier wound onto a winding core in a spiral manner to provide a plurality of plies, the winding core comprising a spiral-like outer contour having a step portion with a size corresponding to the thickness of the information carrier; and a read head provided in a central recess of the winding core for reading data from the spirally-wound information carrier by focusing a light beam on selected individual plies.

26. The memory device as claimed in claim 25, wherein data is read by moving the read head and keeping the data storage medium stationary.

27. A memory device comprising:

a data storage medium comprising an information carrier wound onto a winding core in a spiral manner to provide a plurality of plies, the winding core comprising a spiral-like outer contour having a step portion with a size corresponding to the thickness of the information carrier; and a read/write head provided in a central recess of the winding core for reading data from and writing data to the spirally-wound information carrier by focusing a light beam on selected individual plies.

28. The memory device as claimed in claim 27, wherein data is read or written by moving the read/write head and keeping the data storage medium stationary.

29. A winding core for spirally winding a data storage medium comprising an information carrier thereon, wherein the winding core comprises a spiral-like outer contour having a step portion with a size corresponding to the thickness of the information carrier.

30. The winding core as claimed in claim 29, wherein the winding core has a one-piece construction.

31. The winding core as claimed in claim 29, wherein the winding core has a two-piece construction.

32. The winding core as claimed in claim 31, wherein the two-piece construction comprises a substantially cylindrical member and a wedge-shaped member extending at least partially around the outer surface of the substantially cylindrical member.

* * * * *